United States Patent [19]
Hahn

[11] Patent Number: 5,701,447
[45] Date of Patent: Dec. 23, 1997

[54] METHOD AND APPARATUS FOR ELIMINATING LATCH PROPAGATION DELAYS IN AN ALIGNMENT UNIT FOR USE IN A FRACTIONAL BUS ARCHITECTURE

[75] Inventor: Michael G. Hahn, Folsom, Calif.

[73] Assignee: Intel Corporation, Santa Clara, Calif.

[21] Appl. No.: 508,831

[22] Filed: Jul. 28, 1995

[51] Int. Cl.[6] .................................................. G06F 1/12
[52] U.S. Cl. ............................................. 395/559; 395/309
[58] Field of Search ................................. 395/306, 309, 395/551, 555, 559

[56] References Cited

U.S. PATENT DOCUMENTS

| | | | |
|---|---|---|---|
| 3,696,338 | 10/1972 | Preiss | 340/172.5 |
| 4,484,259 | 11/1984 | Palmer et al. | 364/754 |
| 5,018,170 | 5/1991 | Wilson | 375/120 |
| 5,025,387 | 6/1991 | Frane | 364/493 |
| 5,117,443 | 5/1992 | Shires | 375/111 |
| 5,319,771 | 6/1994 | Takeda | 395/550 |
| 5,349,544 | 9/1994 | Wright et al. | 364/600 |
| 5,434,996 | 7/1995 | Bell | 395/550 |
| 5,454,093 | 9/1995 | Abdulhafiz et al. | 395/460 |
| 5,471,587 | 11/1995 | Fernando | 395/309 |
| 5,568,076 | 10/1996 | Pelella et al. | 327/174 |

Primary Examiner—Dennis M. Butler
Attorney, Agent, or Firm—Blakely, Sokoloff, Taylor & Zafman

[57] ABSTRACT

An alignment unit is provided for aligning signals transmitted between a core clock domain and a bus clock domain. The alignment unit includes at least one alignment latch connected along each signal path between the core and bus clock domains. For critical path signal lines, the alignment unit also includes a latch bypass to allow critical signals to bypass the latch in circumstances when the core and bus clock signals are already aligned. The bypass mechanism includes a multiplexer which transmits the critical path signal through a tristate buffer if the clock signals are aligned or through a latch and a tristate buffer if the clock signals are unaligned. By bypassing the latch when the signals are aligned, latch propagation delays are avoided. Method and apparatus embodiments are disclosed.

9 Claims, 6 Drawing Sheets

METHOD AND APPARATUS FOR ELIMINATING LATCH PROPAGATION DELAYS IN AN ALIGNMENT UNIT FOR USE IN A FRACTIONAL BUS ARCHITECTURE

BACKGROUND OF THE INVENTION

1. Field of the Invention

The invention generally relates to computer systems employing a fractional bus architecture and in particular to alignment units for use in aligning signals transmitted between separate clock domains within a fractional bus architecture.

2. Description of Related Art

Many state of the art computer systems employ circuit components operating within separate clock domains each having a separate clock rate. For example, the core of a microprocessor may operate at 100 megahertz (MHz) whereas bus circuitry of the microprocessor, connecting the core with external components through an external bus, may operate at only 50 MHz. Such a system is referred to as a fractional bus system because the bus circuitry operates at a clock rate that is a fraction of the core clock rate.

A general fractional bus system may be referred to as a M:N system wherein M/N represents the ratio of the clock rate of the bus circuitry to that of the microprocessor core. For example, the above described system is a 1:2 fractional bus system. Other exemplary fractional bus systems are 2:3, 2:4 and 2:5.

In a fractional bus system, clock signals of the two separate domains are not always aligned. This is illustrated in FIG. 1 which sets forth the clock signals for a 2:3 fractional bus system. In FIG. 1, a core clock signal 10 is shown in relation with an external bus clock signal 12 and a corresponding internal bus clock signal 13. The external bus clock signal is employed by a bus system external to the microprocessor. The internal bus clock signal is employed by bus circuitry within the microprocessor provided for interfacing the core with the bus system. Rising edges of the internal and external bus clock signals are synchronized. However, falling edges of the internal and external bus clock signals are not synchronized. Rather, falling edges of the internal bus clock signal follow the rising edges of the internal bus clock signal by one half of the clock period of the core clock signal, as shown. The internal bus signal has the same period as the external bus signal but its "high time" corresponds with the high time of the core clock signal. Hence, the internal bus clock signal does not have equal duty cycles. Transitions in the internal bus clock signal are always synchronized with transitions of the core signal (although one may be rising while the other is falling and vice versa).

The core clock signal and the internal bus signal are both generated within the microprocessor. The external bus clock signal is generated external to the microprocessor. In the following description, alignment of the clock signals of the two separate domains will be described primarily with reference to the core clock signal and the internal bus clock signal.

As can be seen, three clock periods of the core clock are equivalent to two clock periods of the internal bus clock. The rising edge of the internal bus clock is synchronized with the rising edge of the core clock only at time 14 when the clock signals are said to be fully aligned. The rising edge of the internal bus clock is synchronized with the falling edge of the core clock at time 16 when the clock signals are said to be unaligned. Because the clock signals are unaligned at time 16, a signal transmitted from the bus to the core at time 16 must be aligned or resynchronized with the core domain. Likewise, a signal transmitted from the core to the bus at time 16 must also be aligned or resynchronized with the bus domain. This will be explained more fully below with reference to FIG. 2.

Many practical systems employ a two-phase clock system, illustrated in FIG. 2, with each clock domain having phase 1 and phase 2 clock signals. For example, a core domain clock signal 20 has a phase 1 signal 22 and a phase 2 signal 24. The phase 2 signal is the inverted version of the phase 1 signal, with some gap delay (not shown) imposed to eliminate race conditions. FIG. 2 also illustrates an internal bus domain clock signal 26 having a phase 1 signal 28 and a phase 2 signal 30.

Signals are transmitted from one domain to another in synchronization with rising edges of the phase 1 clock signal of the first domain and are sampled by a receiving latch during a subsequent high time of the phase 2 clock signal of the second domain and vice versa. For example, a signal transmitted at rising edge 32 of the bus phase 1 clock signal is sampled during high time 34 of the core phase 2 clock signal as illustrated by arrow 36.

To sample a signal during the high time, the signal must be available to the receiving circuitry well in advance of the falling edge to allow for sufficient set up time. In other words, there must be sufficient time between the rising edge of the transmitting clock domain and a subsequent falling edge of the receiving clock domain to allow the signal to be transmitted to the receiving domain while also allowing sufficient set up time for the circuitry in the receiving domain to unambiguously receive the signal. In FIG. 2, the minimum set up time necessary during high time 34 is identified by reference 35. The clock domains are said to be aligned if one clock period (or cell time) minus any necessary set up time is available for transmission of the signal. No further manipulation of the transmitted signal is required. In FIG. 2, this case is illustrated by transmitted signal 36.

The clock domains are said to be unaligned if only one half of a full clock period (i.e., one clock phase) minus any necessary set up time is available. In such a case, the transmitted signal typically is sent through an alignment latch which delays the signal by an amount sufficient to align the signal with the receiving clock domain. For example, rising edge 38 of the bus phase 1 clock signal is synchronized with rising edge 40 of high time 41 of the core phase 2 clock signal. Accordingly, a signal transmitted at rising edge 38 must be detectable by the core receive latch before time 45 which represents the minimum set up time necessary before the receiving latch stops sampling input signals at trailing edge 43. However, in practical systems, because of propagation delays, there may not be sufficient time for a signal transmitted at rising edge 38 to be detectable by the core receiving latch by time 45. Accordingly, proper reception of the transmitted data cannot be guaranteed during high time 41. Hence, the transmitted signal is delayed by an alignment latch for transmission after edge 43. The transmitted signal is then sampled during the high time beginning at rising edge 44. In FIG. 2, the latch delay is denoted by arrow 46 and the subsequent transmission to the core receiving circuitry is denoted by arrow 47.

Hence, to ensure alignment, some conventional systems employ an alignment unit having an alignment latch on each signal path. In such systems, all signals transmitted from one domain to another are sent through the alignment latch of the corresponding signal path. If the clock signals are unaligned, the latches are disabled to delay the transmitted signals by a sufficient amount to ensure alignment. If the clock signals are initially aligned, then the alignment latches are enabled and the transmitted signals are passed through the latch. Nevertheless, even when signals are merely passed through an alignment latch, the latch causes a certain amount of propagation delay to the signal. For critical signals, the propagation delay caused by the latch may prevent timely reception of the signal. This is illustrated by timing diagrams 50, 52 and 54 of FIG. 2.

Note that some conventional systems employ other alignment mechanisms which do not use an alignment latch. Also, some systems employ an alignment latch on some signal paths and employ alternative alignment mechanisms on other signal paths.

Timing diagram 50 of FIG. 2 illustrates an input signal input to an alignment unit containing an alignment latch for transmission from the bus domain to the core domain. The input signal is delayed by a delay time 56 wherein represents propagation delays occurring within circuitry prior to the alignment unit latch. Timing diagram 52 represents the signal output from the alignment unit. Delay time 58 represents a delay occurring during propagation within the latch even though the latch is enabled and therefore does not intentionally delay the signal. Finally, timing diagram 54 represents the signal actually received by the receiving latch of the core domain. Time delay 60 represents transmission propagation delays occurring between the alignment latch and the receiving latch of the core domain. With these various delays, the input signal is not actually received by the received latch of the core domain until after time 35 and, hence, sufficient set up time is not available during high time 34. Accordingly, the signal cannot be unambiguously received during high time 34. Because the signal cannot be received during high time 34, the signal will not be received until high time 41. Accordingly, the total transmission time is about two periods of the core signal.

Hence, the transmission of a signal through an alignment latch, even if the latch is enabled, can cause sufficient signal propagation delay to prevent timely reception of a signal. If the signal is a critical signal, failure to receive the signal in a timely manner may cause functional failures. To avoid such failures, the clock rate of the system may need to be lowered.

An example of such a critical signal is a cache hit signal transmitted from an internal cache into bus unit logic. If the cache hit signal is not received by the bus unit logic in a timely manner, the bus unit may transmit an unnecessary memory request to the external bus causing the bus to access external memory to retrieve data already stored in the internal cache.

It would be desirable to provide an improved alignment unit which eliminates the aforementioned delay problem associated with the conventional latch alignment unit, at least for critical signals. It is to that end that aspects of the present invention are drawn.

SUMMARY OF THE INVENTION

In accordance with the invention, a method and apparatus is provided for eliminating alignment latch-induced signal delays within M:N fractional bus systems having an alignment unit. In one embodiment, wherein M is at least 2 and N is not an integer multiple of M, a critical signal path latch bypass is employed within the alignment unit whereby critical signals are not transmitted through an alignment latch when the clock signals of two separate clock domains are aligned. Rather, when aligned, a multiplexer directs critical signals through a tristate buffer. When unaligned, the multiplexer directs the critical signals through the alignment latch, then through a tristate buffer. Non-critical signals are transmitted through the alignment latch, whether the clock phases are aligned or not. In other embodiments, the latch bypass may be employed for non-critical signals as well as critical signals. Also, principles of the invention may be applicable to other fractional bus systems than those wherein N is at least two and N is not an integer multiple of M. Indeed, principles of the invention may be advantageously applied to any system wherein signals are transmitted between two clock domains of unequal clock rates.

By bypassing an alignment latch when the clock domains are aligned, latch propagation delay is avoided. In such circumstances, the only delay arises from transmission through the tristate buffer, which is considerably less than the propagation delay associated with a latch. Hence, latch-induced propagation delay is avoided. Other advantages and features of the invention will be apparent from the detailed description which follows and from the drawings attached hereto.

DETAILED DESCRIPTION OF EXEMPLARY EMBODIMENTS OF THE INVENTION

Figure 3:
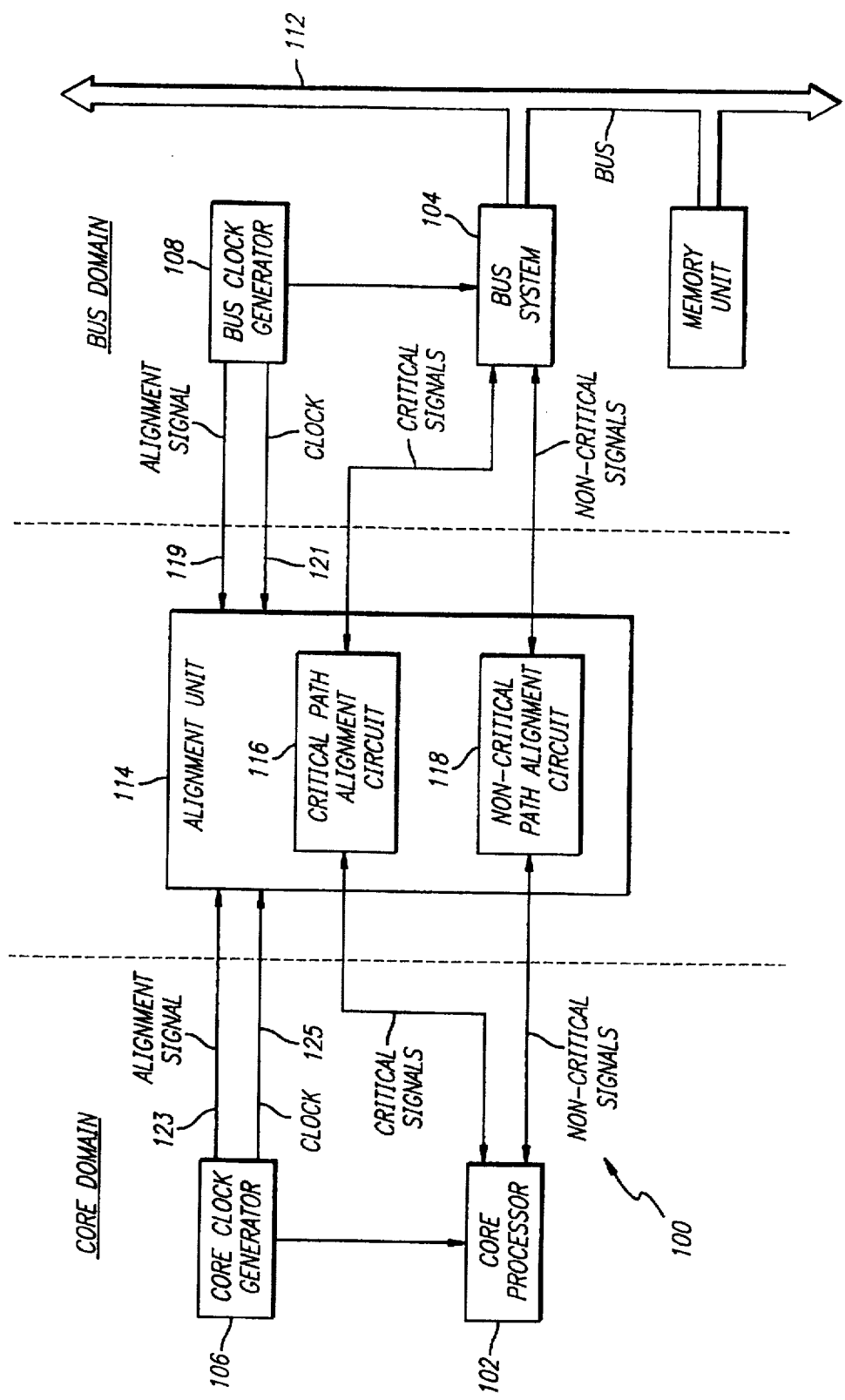
FIG. 3 is a block diagram illustrating a computer system having an alignment unit, configured in accordance with the invention, for aligning signals transmitted between a core clock domain and a bus clock domain.

With reference to the remaining figures, exemplary embodiments of the invention will now be described. Referring first to FIG. 3, a computer system 100 is illustrated which includes a microprocessor 101 having a core domain and a bus domain. The core domain includes a core processor 102 and the bus domain includes a bus processor 104. Core processor 102 operates from a core clock signal generated by a core clock generator 106. Bus system 104 operates from an internal bus clock signal generated by bus clock signal generator 108. In many implementations, however, a single clock generator is provided which generates both the core clock signal and the internal bus clock signal. For clarity in describing concepts of the invention, separate core clock and bus clock generators are illustrated.

Bus system 104 interfaces with peripheral components such as memory unit 110 through a bus 112. The peripheral units and the bus operate from an external bus clock signal which is generated externally from the microprocessor by an external clock generating unit (not shown). In the following, unless otherwise noted, all references to a bus signal refer to the internal bus signal.

The core clock signal and the bus clock signal may be, for example, 100 MHz and 66.7 MHz, respectively. With the foregoing exemplary frequencies, computer system 100 represents a 2:3 fractional bus system because the bus clock rate of 66.7 MHz is two-thirds of the core clock rate of 100 MHz.

Both the core and internal bus clock domains employ two-phase clock systems. Hence, the core clock domain employs a core phase 1 clock signal and core phase 2 clock signal. Likewise, the bus clock domain employs a bus phase 1 clock signal and bus phase 2 clock signal. The external bus clock is typically a single phase clock.

Transmission of signals, such as control and data signals, between the two clock domains is controlled by an alignment unit 114. Alignment unit 114 receives clock signals from both core clock generator 106 and bus clock generator 108. Signals transmitted from the core clock domain to the bus clock domain are resynchronized to the bus clock. Signals transmitted from the bus clock domain to the core clock domain are resynchronized to the core clock.

Alignment unit 114 includes separate components for aligning critical path signals and non-critical path signals. Critical path signals are those which require the fastest possible transmission as determined by system designers. An example of a critical path signal is the cache hit signal discussed above. Non-critical path signals are those which do not require the fastest possible transmission rate and include data transmission signals.

Critical path signals are aligned using a critical path alignment circuit 116. Critical path alignment circuit 116 includes components (described below with reference to FIG. 4) for minimizing alignment delay for critical path signals. Non-critical path signals are aligned using a non-critical path alignment circuit 118 which includes generally slower circuitry than employed within circuit 116.

Alignment unit 114 receives clock signals from core clock generator 106 and bus clock generator 108. More specifically, the alignment unit receives both phase 1 and phase 2 clock signals from both clock generators. The alignment unit also receives phase 1 and phase 2 alignment signals for both the core clock and the bus clock indicating, respectively, whether the phase 1 core and bus clock signals are aligned and whether the phase 2 core and bus clock signals are aligned. In FIG. 3, a single clock line 121 represents a pair of phase 1 and phase 2 clock lines connecting bus clock generator 108 with alignment unit 114. Likewise, a single alignment signal line 119 represents the phase 1 and phase 2 alignment signal lines connecting the bus clock generator with the alignment unit. Similarly, a single alignment signal line 123 and a single clock signal line 125 are shown connecting core clock generator 106 with alignment unit 114.

Data signals are transmitted by the core processor at a rising edge of the core clock phase 1 signal and are received or sampled during a subsequent high time of the bus clock phase 2 signal. Likewise, data signals are transmitted by the core processor at a rising edge of the core clock phase 2 signal and are received or sampled during a subsequent high time of the bus clock phase 1 signal. Signals are transmitted from the bus to the core in the same manner. Alignment 114 operates to delay transmission of signals between the two clock domains, as needed, to ensure that the signals are properly aligned and can be unambiguously received by circuit components within the other clock domain.

Figure 4:
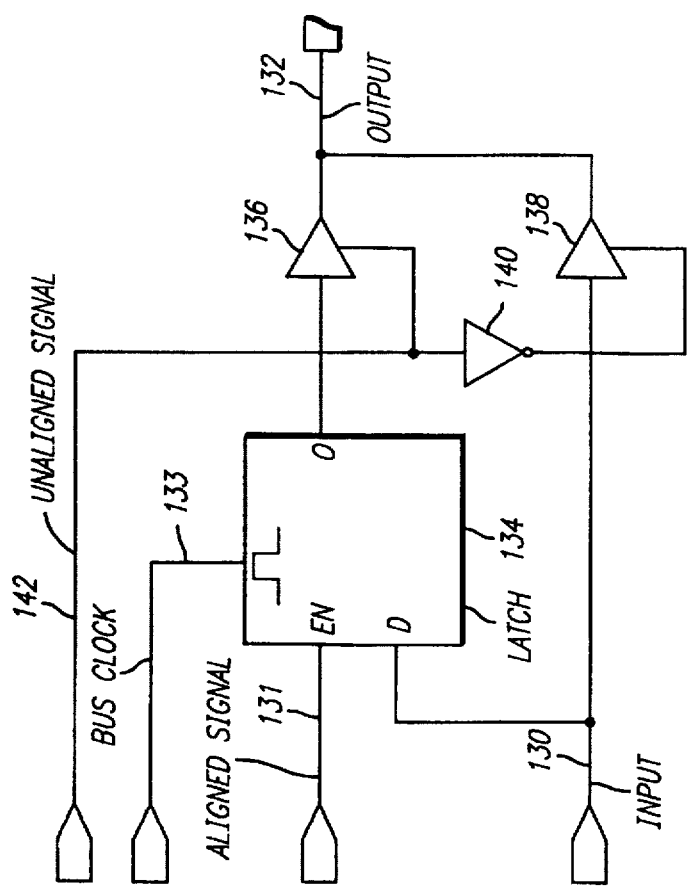
FIG. 4 is a block diagram of a critical-path alignment circuit of the alignment unit of FIG. 3.

As noted, critical path alignment circuit 116 includes components for aligning critical path signals between the core and bus clock domains. To this end, alignment circuit 116 includes alignment components on each critical path signal line transmitting signals from the core domain to the bus domain. Alignment circuit 116 also includes alignment components on each critical path signal line transmitting signals from the bus domain to the core domain. In FIG. 4, the alignment components for one of the critical path lines transmitting signals from the bus domain to the core domain are illustrated. The alignment components for other critical path lines are similar or identical.

Alignment circuit 116 of FIG. 4 includes a input line 130 for receiving signals from the bus domain and an output line 132 for transmitting aligned signals to the core domain. Alignment circuit 116 also includes a latch 134, a pair of tristate buffers 136 and 138 and an inverter 140 connected as shown. Latch 134 and tristate buffer 136 represent one signal path for connecting signals from input line 130 to output 132. Tristate buffer 138 represents a second separate path. The path through tristate buffer 138 is a bypass around latch 134. Selection between the two paths is achieved through the operation of inverter 140 which receives a signal along input line 142 indicating whether the core and bus phase 1 clock signals are unaligned. If unaligned, then the signal on line 142 is high thereby enabling tristate buffer 136 and, through inverter 140, disabling tristate buffer 138. Hence, if the clock signals are unaligned, the signal passes from input 130 to output 132 through latch 134 and tristate buffer 136. If the clock signals are aligned, then the signal received along line 142 is low thereby enabling tristate buffer 138 and disabling tristate buffer 136. Hence, when the clock signals are aligned, data is transmitted from input 130 to output 132 through tristate buffer 138 and the latch is bypassed. Accordingly, latch propagation time delays, discussed above, are avoided for critical path signals when the bus and core signals are aligned.

As noted, when unaligned, signals are transmitted through latch 134. Latch 134 is configured to latch the signal, for predetermined period of time, before retransmitting the signal to tristate buffer 136. The amount of latch time imposed by latch 134 is selected to ensure that the output signal asserted on line 132 can be unambiguously received by the core domain circuitry at a subsequent high time of the core domain phase 2 clock signal. (As noted above, to be unambiguously received during the high time of the core domain phase 2 clock signal, the transmitted signal must actually be detectable by a received latch of the core domain before the end of the high time by an amount of time sufficient to allow set up.) Latch 134 is enabled by an alignment signal received along line 131. The alignment signal received along line 131 may be based upon the alignment signal received along line 142. These alignments signals are, in turn, based upon the alignment signal received along line 119 (FIG. 3) which is generated by the bus clock generator. As noted above, the alignment signal generated by the bus clock generator identifies when the clock domains are aligned. Depending upon the implementation, the alignment signals actually received by alignment circuit 116 of FIG. 4 may either be identical to the overall alignment signal received along line 119 (FIG. 3) or may be modified versions thereof, perhaps inverted or delayed slightly, as needed to ensure proper operation of the alignment circuit. For example, the alignment signal received along line 142 is preferably one clock phase ahead of data received along input line 130 to ensure that tristate buffers 136 and 138 are enabled or disabled prior to reception of the data. It should be noted that latch 134 also receives a clock signal along line 133 which may be identical to, or based on, the bus clock signal received along line 121 (FIG. 3).

Of course, latch 134 could be configured to only latch the signal when the clock signals are unaligned and to pass the signal, without latching, when the clock signals are aligned. However, as noted above, even when a latch does not latch a signal, the latch circuitry imposes some propagation delay. This latch propagation delay, which should be distinguished from the latch time imposed when signals are actually latched, can hinder the transmission of critical path signals. Hence, when the clock signals are aligned, and no actual latching is necessary, the latch is completely bypassed, thereby avoiding the latch propagation delay. Of course, tristate buffer 138 also imposes some slight propagation delay, but it is not as significant as the propagation delay that would otherwise occur within latch 134.

Figure 5:
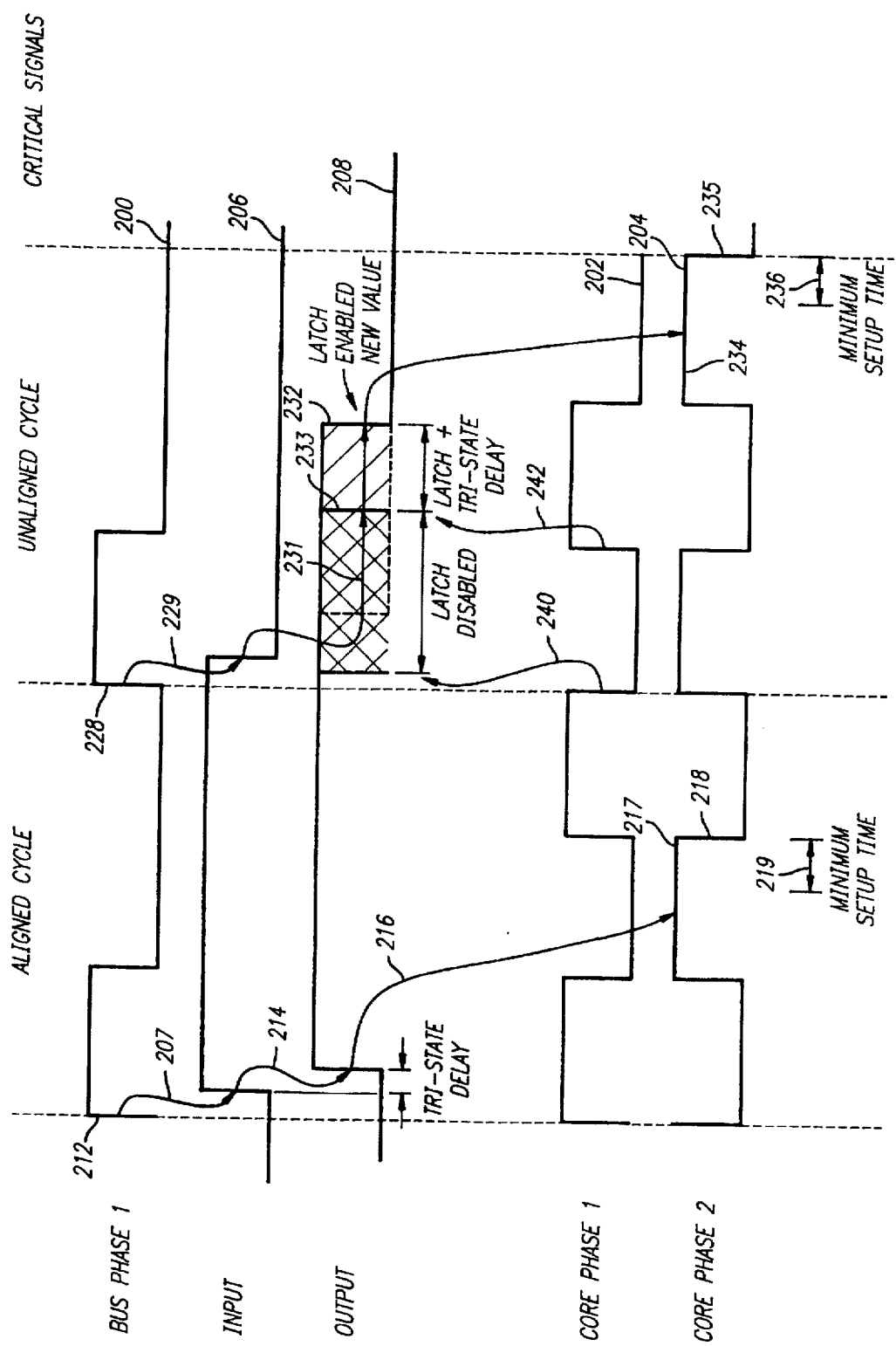
FIG. 5 is a timing diagram illustrating the transmission of critical path signals through the critical-path alignment circuit of FIG. 4 for a 2:3 fractional bus implementation.

These concepts are illustrated in FIG. 5 with reference to several timing diagrams. More specifically, FIG. 5 illustrates the transmission of signals from a bus domain to a clock domain for a 2:3 fractional bus implementation. The bus phase 1 clock signal is denoted 200 and the core phase 1 clock signal is denoted 202. The core phase 2 clock signal is denoted 204. The core phase 2 clock signal is roughly the inversion of the core phase 1 clock signal. Although not shown in FIG. 5, the phase 2 clock signal may differ from the phase 1 signal by some phase gap.

Signals transmitted at rising edges of bus phase 1 signal 200 are sampled during high times of core phase 2 signal 204. The particular high period during which the receiving domain can unambiguously sample the signals, however, depends upon whether the clock signals are aligned and upon the amount of delay occurring in the past prior to the alignment circuitry and as a result of the alignment circuitry.

FIG. 5 illustrates an input signal 206 representing a critical signal transmitted from the bus domain in synchronization with the bus phase 1 signal but delayed, by circuit propagation delays, prior to reception by the alignment unit. An output signal 208 is also illustrated which incorporates delays occurring both during an aligned cycle and an unaligned cycle.

For efficient transmission, signals transmitted in synchronization with the bus phase 1 signal should be detectable during the next subsequent high time of the core phase 2 signal. FIG. 5 illustrates a minimum set up time prior to each of the falling edges of the high time of the core phase 2 signal indicating the amount of set up time necessary to properly receive signals.

Having described the various signals illustrated in FIG. 5, transmission of signals from the bus to the core using the alignment circuit of FIG. 4 will now be described. During an aligned cycle, a signal is transmitted at the first rising edge 212 of bus phase 1 and is received as input signal 206 after a slight delay 207. Because the clock domains are aligned, the signal is transmitted through tristate buffer 138 (FIG. 4) which imposes only a further slight delay 214. The signal is then output, line 216, to the core where it is sampled during high time 217 before set up time 219 preceding by falling edge 218 of core phase 2. As can be seen, the amount of time available for transmission along path 216 of FIG. 5 is more than the minimum necessary set up time. Hence, the signal can be unambiguously received during high time 217. Thus, for the aligned case, using the bypass of tristate buffer 138, the total transmission time is only about one core clock signal period.

Figure 1:
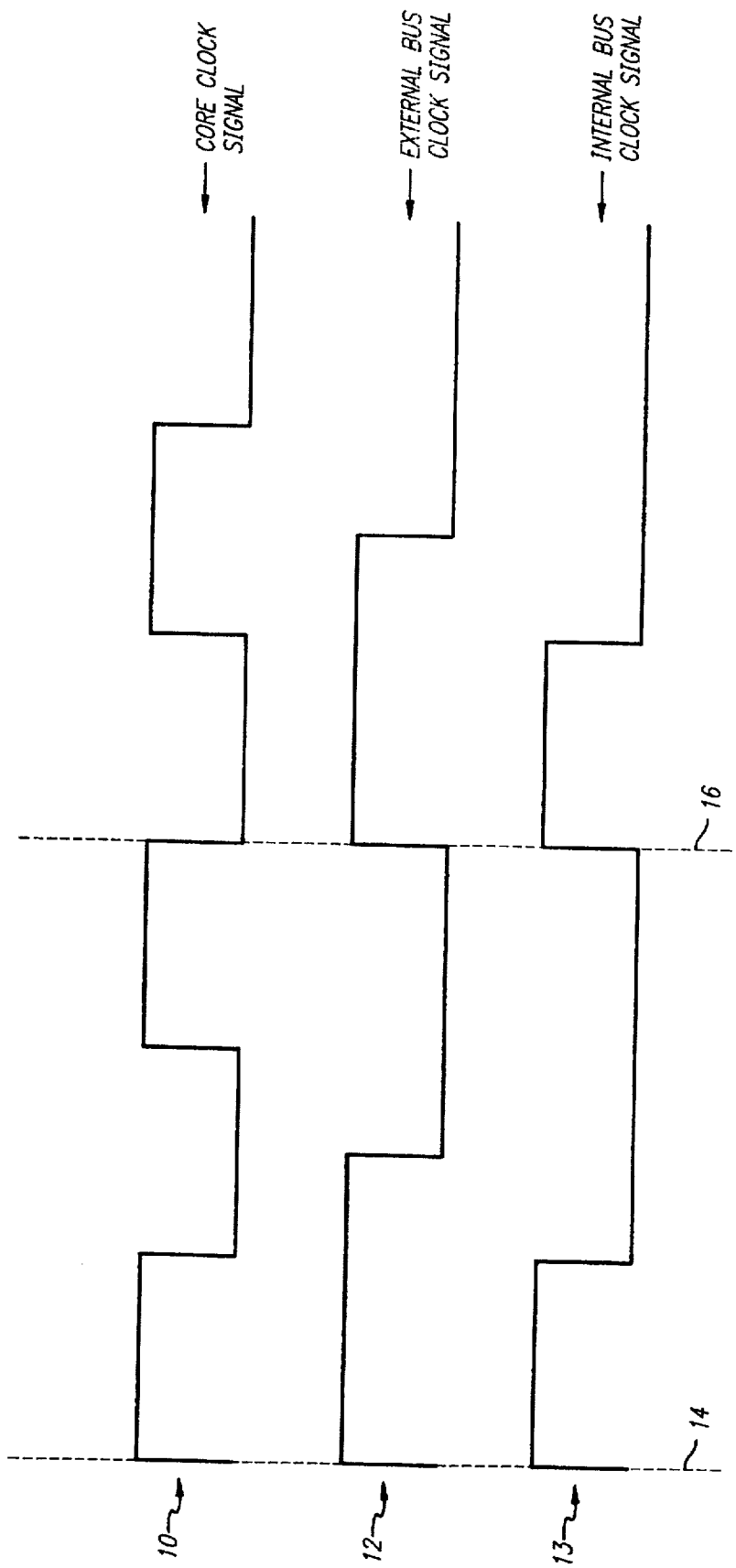
FIG. 1 is a timing diagram illustrating a 2:3 fractional bus implementation.
Figure 2:
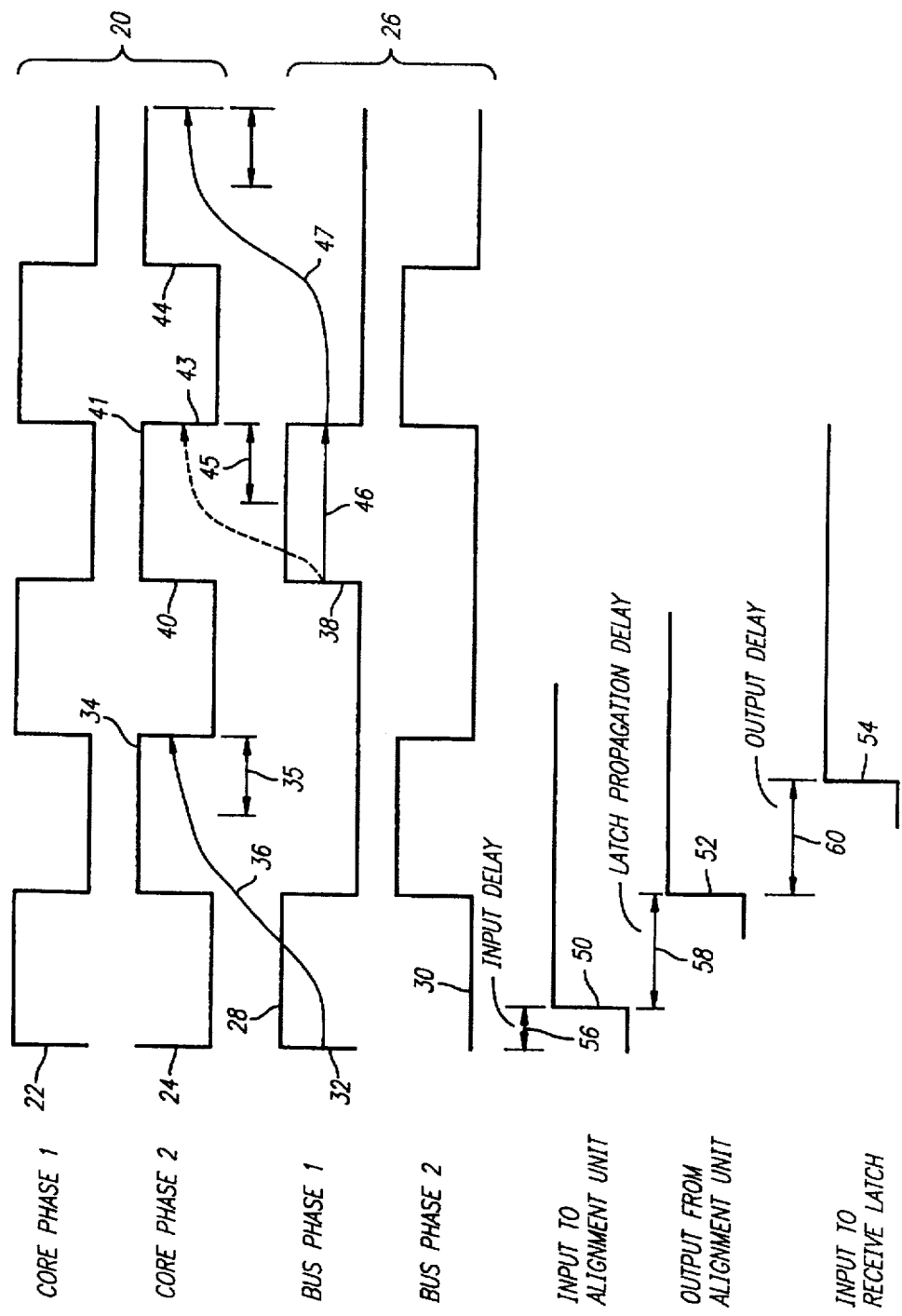
FIG. 2 is a timing diagram illustrating a two-phase 2:3 fractional bus implementation.

As noted above with reference to FIG. 2, transmission of a critical path signal in an aligned case using a conventional system may require almost two clock cycles of the core clock signal, if the signal is passed through an alignment latch causing sufficient propagation delay time to prevent unambiguous reception of the signal within the next high time of the core clock signal.

Hence, for the aligned case, FIG. 5 illustrates that a considerable improvement in overall transmission time is achieved using the invention by bypassing the latch and, instead, routing the signal through only a tristate buffer. Of course, the signals of FIG. 5 are not necessarily to scale and the actual delays imposed by the tristate buffer and by the latch may differ. Nevertheless, FIG. 5 illustrates the principles of the invention.

FIG. 5 also illustrates transmission of signals in an unaligned case wherein a rising edge 228 of bus phase 1 signal 200 is not aligned with a rising edge of core phase 1 signal 202. Because the core and the bus signals are not aligned, the circuitry of FIG. 4 selects the latch path including latch 134 and tristate buffer 136. Initially, a signal transmitted at rising edge 228 is delayed by time period 229 prior to input to the alignment unit. Next, the signal is delayed by time 231 because the latch is initially disabled. After the latch is enabled, at time 233, the signal is further delayed until time 232 as a result of latch propagation time and tristate buffer delay time. Ultimately, the signal is retransmitted from the alignment unit at time 232 for reception during high time 234. The time available between rising edge 232 and falling edge 235 is greater than the minimum set up time 236 and the signal can therefore be unambiguously received during high time 234.

In FIG. 5, arrows 240 and 242 are shown between the core phase 1 signal and the output signal to indicate that the operation of the latch is triggered by falling and rising edges of the core phase 1 signal. There is, however, a slight delay between corresponding transitions in the core phase 1 signal and operation of the latch caused by propagation delays and transmitting control signals to the latch.

Figure 6:
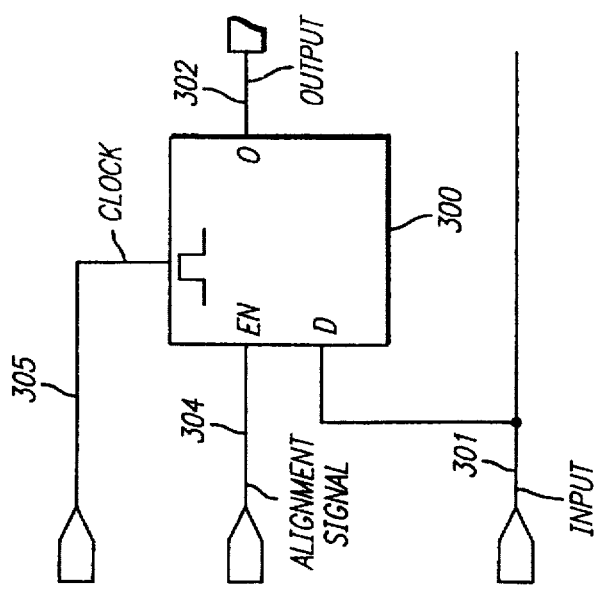
FIG. 6 is a block diagram of a non-critical path alignment circuit of FIG. 3.
Figure 7:
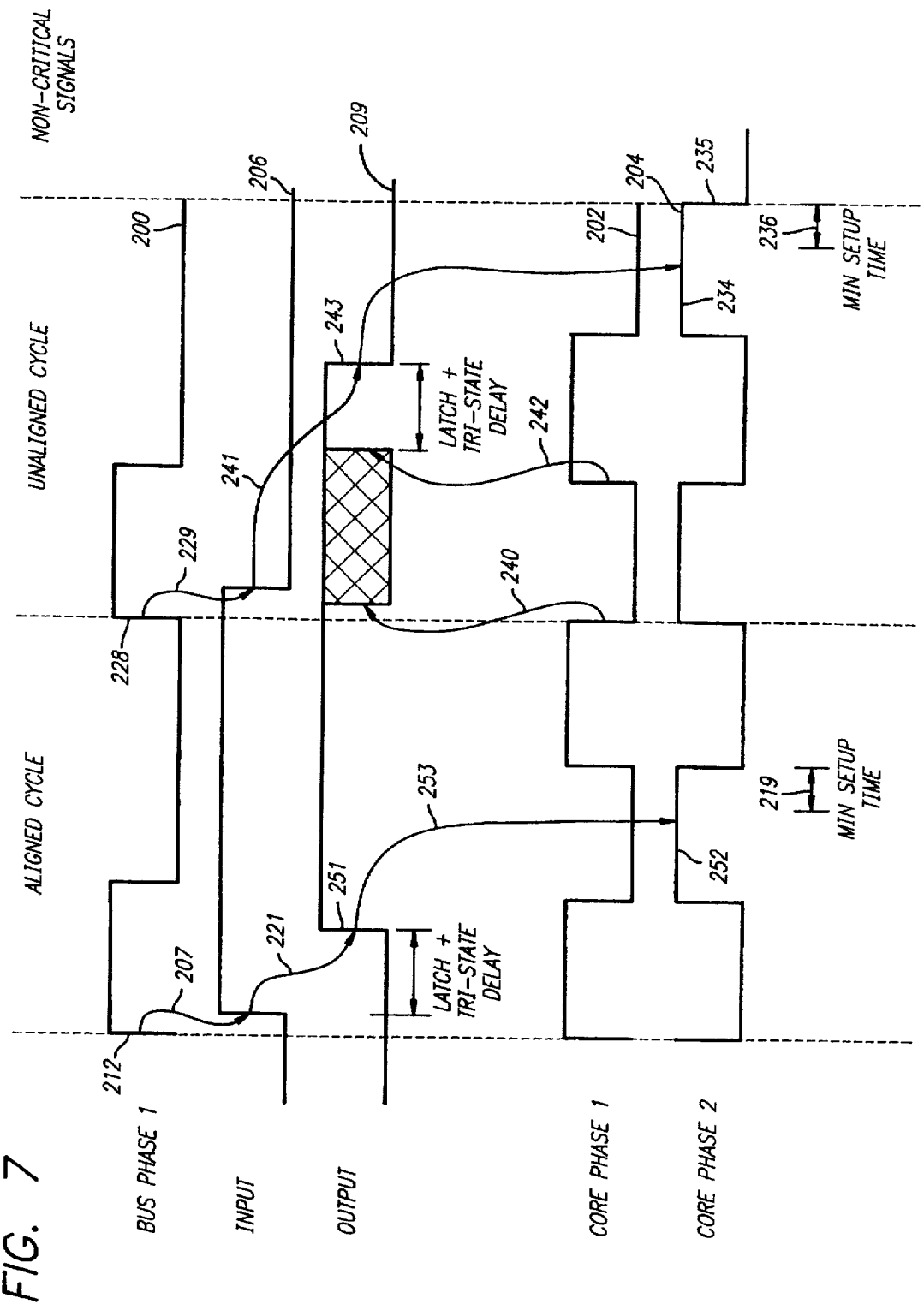
FIG. 7 is a timing diagram illustrating the transmission of non-critical path signals through the non-critical path alignment circuit of FIG. 6 for a 2:3 fractional bus implementation.

Thus, FIGS. 4 and 5 illustrate a method and apparatus for aligning critical path signals. FIGS. 6 and 7 illustrate the same for non-critical path signals. FIG. 6 illustrates a non-critical path alignment circuit which merely includes a latch and various input and output lines connected thereto. The latch of FIG. 6 represents merely one latch connected to one signal transmission line from either the core to the bus or from the bus to the core. In contrast with the circuitry of FIG. 4, the alignment circuitry of FIG. 6 does not include an alternative path for bypassing the latch. Also, no tristate buffers are included. Rather, a latch 300 is merely provided which latches an input signal received along line 301 for output along line 302. The signal is latched if the core and bus clock signals are unaligned, as represented by an enable signal 304. If the signals are aligned, the latch merely transmits the signal therethrough, subject to inherent transmission delay within the latch. Latch 300 also receives a clock signal 305. As with the critical path alignment circuit of FIG. 4, the clock and alignment signal lines of the non-critical path alignment circuit of FIG. 6 may be based upon the clock and alignment signals received from the bus clock generator (FIG. 3). However, the signals may be inverted or delayed as needed.

FIG. 7 illustrates the transmission of signals from the bus domain to the core domain using the latch of FIG. 6. As with FIG. 5, FIG. 7 includes a set of timing diagrams illustrating the bus and core clock signals and various delayed versions of the bus signal. In FIG. 7, a signal transmitted at rising edge 212 is delayed prior to the alignment unit by the amount of time 207. The signal is further delayed by time period 221 as a result of latch propagation delays. The signal is output from the latch at edge 251 for ultimate reception by the core during high time 252. The overall transmission time is considerably greater than for the corresponding critical path signals of FIG. 5. However, for a non-critical signal, the additional transmission time is not a problem. Hence, the simplified circuitry of FIG. 6 may be employed rather than the more complicated circuitry of FIG. 4.

FIG. 7 also illustrates the transmission of a non-critical path signal within an unaligned cycle. In particular, a signal is transmitted at edge 228 and delayed 241 by the latch. The signal is retransmitted at edge 242 for ultimate reception during high time 234.

Thus, transmission of signals from a bus domain to a core domain has been described and illustrated with reference to FIGS. 4-7. Signals transmitted from the core to bus are transmitted through similar or identical alignment units and principles of the invention apply therein as well.

The computer system described with reference to FIGS. 3-7 may be implemented with a microprocessor core configured using Intel Architecture. However, the invention may be employed within computer systems having microprocessors that are not configured in accordance with Intel Architecture. The actual alignment circuitry including the various latches may be configured within the microprocessor between portions of the microprocessor circuitry that operate in the core clock domain and portions that operate in the bus clock domain.

Conventional design and manufacturing techniques may be employed to actually implement the invention. In one embodiment, the multiplexer portion of the alignment unit is configured using optimized standard cells thereby achieving ease of logic synthesis and ease of layout implementation. Also, although the invention has been primarily described with reference to a two-phase system, the invention may also be applicable to single phase clock systems or to systems employing three or more phases.

The transmission of critical path and non-critical path signals for aligned and unaligned cases have been described for a 2:3 fractional bus architecture. The invention is also applicable to other fractional bus systems, such as M:N systems wherein M is at least 2 and N is a non-integer multiple of M. Indeed, principles of the invention may also be applicable to other fractional bus systems including those wherein N is an integer multiple of M. Also, although the invention has been described with reference to computer systems, principles of the invention may be applicable to other signal transmission systems wherein signals are transmitted between separate clock domains operating at different clock rates. Accordingly, the exemplary embodiments described herein are merely illustrative of the invention and should not be construed as limiting the scope of the invention.

What is claimed is:

1. An alignment unit for a M:N fractional bus where M:N is a ratio of first and second clock domains, the alignment unit comprising:

an input that receives signals from the first clock domain;

an output that transmits signals to the second clock domain;

a latch, coupled between the input and the output, operative to latch signals transmitted between the first and second clock domains;

a latch bypass path which includes a tristate buffer coupled between the input and the output; and a multiplexer which selects the latch bypass path for a signal when the first and second clock domains are aligned, thereby avoiding a propagation delay associated with the latch; otherwise, the signal being propagated through the latch.

2. The alignment unit of claim 1 wherein M is 2 and N is 3.

3. The alignment unit of claim 2 further comprising a second tristate buffer, the latch being coupled to the output through the second tristate buffer.

4. The alignment unit of claim 1 wherein the signal comprises a critical-path signal.

5. A computer system comprising:

core circuitry operating within a core clock domain;

bus circuitry operating within a bus clock domain; and an alignment unit which aligns signals transmitted between the bus circuitry and the core circuitry, wherein the alignment unit includes;

an input that receives signals from the bus circuitry;

an output that transmits signals to the core circuitry;

a latch signal path having a latch coupled between the input and the output, operative to latch signals transmitted therebetween;

a latch bypass path which includes a tristate buffer coupled between the input and the output; and a multiplexer which selects the latch bypass path for a signal when the first and second clock domains are aligned, thereby avoiding a propagation delay associated with the latch; otherwise, the signal being propagated through the latch.

6. The computer system of claim 5 wherein a ratio of a clock rate of the bus domain to a clock rate of the core domain is M/N, where M is at least two and N is not an integer multiple of M.

7. The computer system of claim 6 wherein the signal is a critical path signal.

8. In a computer operating with a M:N fractional bus system, where M:N is a ratio of first and second clock domains, a method of operation comprising the steps of:

providing a first selection signal to a multiplexor that controls transmission of signals between the first and second clock domains, the first selection signal being provided in response to clock signals associated with the first and second clock domains being unaligned;

transmitting a first signal from the first clock domain to the second clock domain through an alignment latch in response to providing the first selection signal to the multiplexor;

providing a second selection signal to the multiplexor in response to the clock signals associated with the first and second clock domains being aligned; and transmitting a second signal from the first clock domain to the second clock domain through a tristate buffer that bypasses the alignment latch in response to providing the second selection signal to the multiplexor.

9. The method of claim 8 wherein M is 2 and N is 3.

* * * * *